US009589182B2

(12) United States Patent
Jung et al.

(10) Patent No.: US 9,589,182 B2
(45) Date of Patent: Mar. 7, 2017

(54) METHOD AND APPARATUS FOR ESTIMATING ORIENTATION OF BODY, AND COMPUTER READABLE STORAGE MEDIUM OF RECORDING THE METHOD

(71) Applicant: Samsung Electronics Co., Ltd., Suwon-si, Gyeonggi-do (KR)

(72) Inventors: Ho-yub Jung, Suwon-si (KR); Jung-seop Kim, Seoul (KR); Jin-wuk Choi, Seoul (KR); Nam-su Ha, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 227 days.

(21) Appl. No.: 14/509,516

(22) Filed: Oct. 8, 2014

(65) Prior Publication Data

US 2015/0098618 A1   Apr. 9, 2015

(30) Foreign Application Priority Data

Oct. 8, 2013   (KR) ........................ 10-2013-0120187

(51) Int. Cl.
*G06K 9/00* (2006.01)
*G06T 7/00* (2006.01)

(52) U.S. Cl.
CPC ........ *G06K 9/00369* (2013.01); *G06T 7/0042* (2013.01); *G06T 2207/10028* (2013.01); *G06T 2207/30196* (2013.01)

(58) Field of Classification Search
USPC ........................................ 382/103, 107, 154
See application file for complete search history.

(56) References Cited

U.S. PATENT DOCUMENTS

| | | | | |
|---|---|---|---|---|
| 5,388,059 | A * | 2/1995 | DeMenthon | ............ G06T 7/004 |
| | | | | 702/152 |
| 7,003,134 | B1 * | 2/2006 | Covell | ............... G06K 9/00369 |
| | | | | 382/103 |
| 7,027,618 | B2 * | 4/2006 | Trajkovic | ............ G06K 9/00221 |
| | | | | 348/154 |
| 7,590,262 | B2 * | 9/2009 | Fujimura | ........... G06K 9/00369 |
| | | | | 382/103 |
| 7,684,894 | B2 * | 3/2010 | Sakai | ................... G05D 1/0246 |
| | | | | 700/245 |
| 8,582,867 | B2 * | 11/2013 | Litvak | ................ G06K 9/00201 |
| | | | | 382/154 |

(Continued)

*Primary Examiner* — Ishrat I Sherali
(74) *Attorney, Agent, or Firm* — Jefferson IP Law, LLP

(57) ABSTRACT

A method of estimating an orientation of a body is provided. The method includes determining a reference point based on a first region of a body, calculating a translation matrix of a world coordinate system based on the reference point; determining a first vector based on the reference point and a second region of the body, calculating a first rotation matrix rotated by an angle α about a first rotation vector, which is perpendicular to the first vector and a Z-axis of the world coordinate system, as a first rotation axis, determining a second vector based on the first vector and a third region of the body, calculating a second rotation matrix rotated by an angle β about the Z-axis of the world coordinate system as a second rotation axis, and calculating a transformation matrix based on the translation matrix, the first rotation matrix, and the second rotation matrix.

17 Claims, 7 Drawing Sheets

(56) References Cited

U.S. PATENT DOCUMENTS

| | | | |
|---|---|---|---|
| 8,638,985 B2* | 1/2014 | Shotton | G06K 9/00369 382/103 |
| 8,755,569 B2* | 6/2014 | Shen | G06K 9/00335 382/107 |
| 8,934,674 B2* | 1/2015 | Tanabiki | G06K 9/00369 348/169 |
| 9,031,327 B2* | 5/2015 | Yokono | G06K 9/00389 382/203 |
| 2003/0063777 A1* | 4/2003 | Trajkovic | G06K 9/00221 382/107 |
| 2008/0212836 A1 | 9/2008 | Fujimura et al. | |
| 2011/0210915 A1 | 9/2011 | Shotton et al. | |
| 2012/0056800 A1 | 3/2012 | Williams et al. | |
| 2012/0070070 A1 | 3/2012 | Litvak | |
| 2012/0172126 A1 | 7/2012 | Padovani et al. | |

* cited by examiner

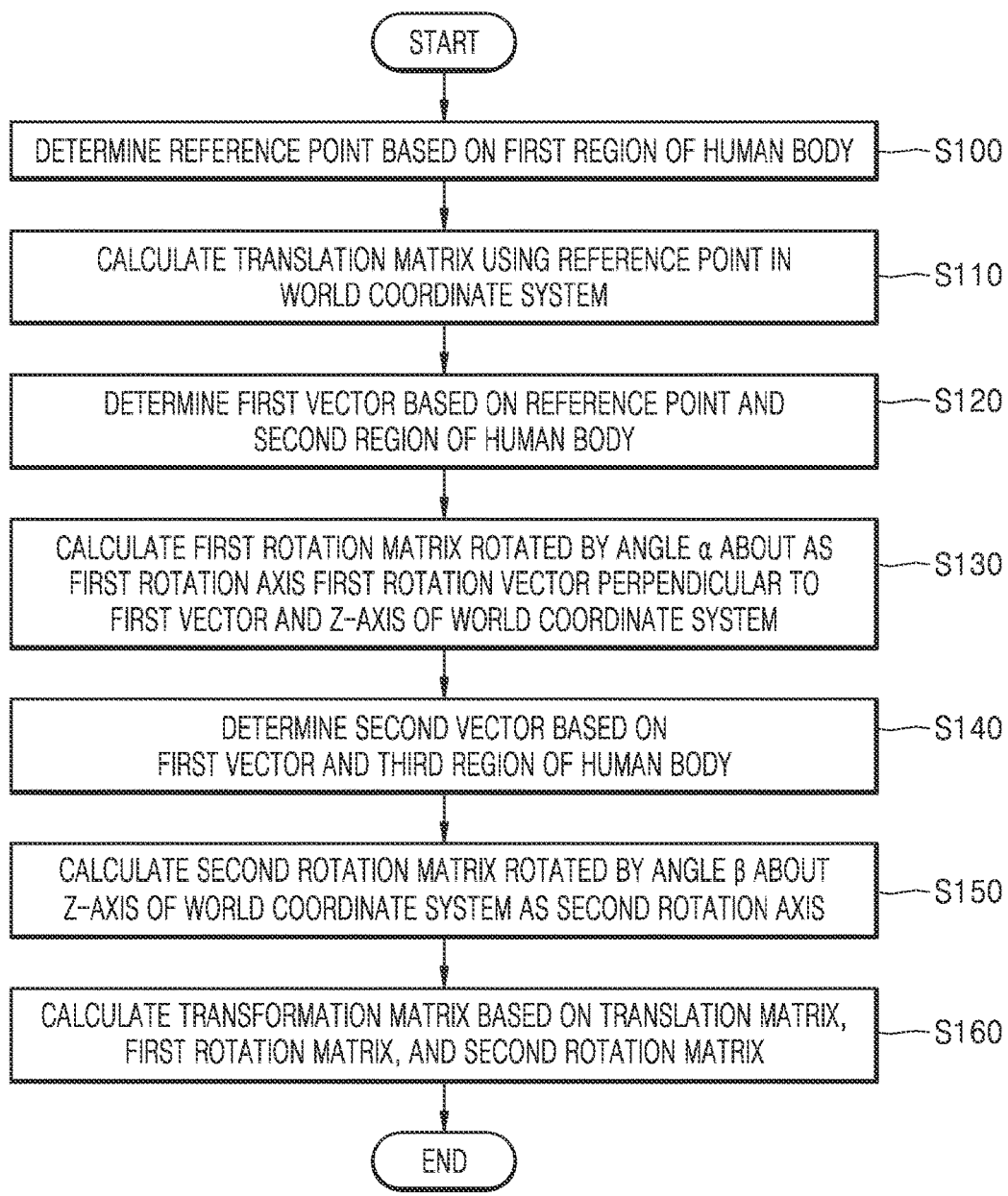

METHOD AND APPARATUS FOR ESTIMATING ORIENTATION OF BODY, AND COMPUTER READABLE STORAGE MEDIUM OF RECORDING THE METHOD

CROSS-REFERENCE TO RELATED APPLICATION(S)

This application claims the benefit under 35 U.S.C. §119 (a) of a Korean patent application filed on Oct. 8, 2013 in the Korean Intellectual Property Office and assigned Ser. No. 10-2013-0120187, the entire disclosure of which is hereby incorporated by reference.

TECHNICAL FIELD

The present disclosure relates to a method and apparatus for estimating the orientation of a body, and a computer readable recording medium of recording the method.

BACKGROUND

An individual's pose may represent their intended behavior and may thus be analyzed and applied to the various fields of computer engineering. Mainly, an individual's pose has been applied to the field of security, the field of robot interaction, or the field of pose recognition, and the like.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods of estimating the orientation of a body by calculating a translation matrix using a reference point on a human body and two rotation matrices using two orientations of the human body to calculate a transformation matrix for transforming a human body coordinate system into a world coordinate system.

In accordance with an aspect of the present disclosure, a method of estimating an orientation of a body is provided. The method includes determining a reference point based on a first region of a human body, calculating a translation matrix of a world coordinate system, based on the determined reference point, determining a first vector based on the determined reference point and a second region of the human body, calculating a first rotation matrix rotated by an angle α about a first rotation vector, which is perpendicular to the determined first vector and a Z-axis of the world coordinate system, as a first rotation axis, determining a second vector, based on the determined first vector and a third region of the human body, calculating a second rotation matrix rotated by an angle β about the Z-axis of the world coordinate system as a second rotation axis, and calculating a transformation matrix based on the calculated translation matrix, the calculated first rotation matrix, and the calculated second rotation matrix. The angle α is an angle between the Z-axis and the determined first vector, and the angle β is an angle between a Y-axis of the world coordinate system and the second vector.

In accordance with another aspect of the present disclosure, an apparatus for estimating an orientation of a body is provided. The apparatus includes a reference point determination unit configured to determine a reference point based on a first region of a human body, a translation matrix calculation unit configured to calculate a translation matrix of a world coordinate system, based on the determined reference point, a first vector determination unit configured to determine a first vector, based on the determined reference point and a second region of the human body, a first rotation matrix calculation unit configured to calculate a first rotation matrix rotated by an angle α about a first rotation vector, which is perpendicular to the determined first vector and a Z-axis of the world coordinate system, as a first rotation axis, a second vector determination unit configured to determine a second vector, based on the determined first vector and a third region of the human body, a second rotation matrix calculation unit configured to calculate a second rotation matrix rotated by an angle β about the Z-axis of the world coordinate system as a second rotation axis, and a transformation matrix calculation unit configured to calculate a transformation matrix, based on the calculated translation matrix, the calculated first rotation matrix, and the calculated second rotation matrix. The angle α is an angle between the Z-axis and the determined first vector, and the angle β is an angle between a Y-axis of the world coordinate system and the determined second vector.

In accordance with another aspect of the present disclosure, a computer readable recording medium is provided, having recorded thereon computer program codes causing a method of estimating an orientation of a body to perform when the computer program codes are read and executed by a processor The method includes determining a reference point based on a first region of a human body, calculating a translation matrix of a world coordinate system, based on the determined reference point, determining a first vector, based on the determined reference point and a second region of the human body, calculating a first rotation matrix rotated by an angle α about a first rotation vector, which is perpendicular to the determined first vector and a Z-axis of the world coordinate system, as a first rotation axis, determining a second vector, based on the determined first vector and a third region of the human body, calculating a second rotation matrix rotated by an angle β about the Z-axis of the world coordinate system as a second rotation axis, and calculating a transformation matrix, based on the calculated translation matrix, the calculated first rotation matrix, and the calculated second rotation matrix. The angle α is an angle between the Z-axis and the determined first vector, and the angle β is an angle between a Y-axis of the world coordinate system and the determined second vector.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a flowchart of a method of estimating an orientation of a body according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the terms 'first', 'second', 'third', etc., may be used herein to describe various elements, components, regions, layers and/or sections, these elements, components, regions, layers and/or sections should not be limited by these terms. These terms are only used to distinguish one element, component, region, layer or section from another region, layer or section.

The terminology used herein is for the purpose of describing particular embodiments only and is not intended to be limiting of the disclosure. As used herein, the terms "comprises" and/or "comprising" specify the presence of stated features, integers, steps, operations, elements, and/or components, but do not preclude the presence or addition of one or more other features, integers, steps, operations, elements, components, and/or groups thereof.

Hereinafter, various embodiments of the present disclosure will be described in detail with reference to the accompanying drawings.

Figure 1:
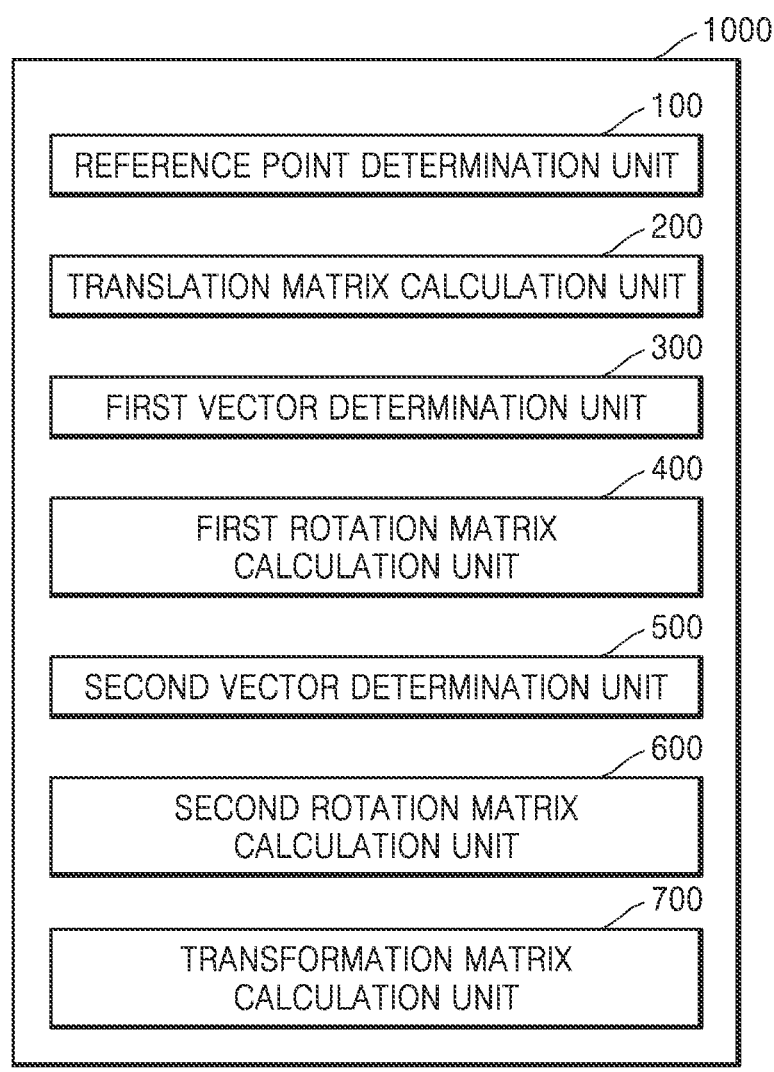
FIG. 1 is a block diagram of an apparatus for estimating an orientation of a body, which is capable of performing a method of estimating the orientation of a body according to an embodiment of the present disclosure.

FIG. 1 is a block diagram of an apparatus for estimating an orientation of a body, which is capable of performing a method of estimating the orientation of a body according to an embodiment of the present disclosure.

Referring to FIG. 1, an apparatus 1000 may include a reference point determination unit 100, a translation matrix calculation unit 200, a first vector determination unit 300, a first rotation matrix calculation unit 400, a second vector determination unit 500, a second rotation matrix calculation unit 600, and a transformation matrix calculation unit 700.

These elements will be described in detail.

The reference point determination unit 100 may determine a reference point based on a first region of a human body.

The reference point may be determined based on the first region of the human body. For example, the first region may include the head and/or neck of the human body, the information of which is easily obtained in a world coordinate system. In this case, the reference point determined based on the head and/or neck may be set as central coordinates on a human body coordinate system.

The reference point may be a point at which joints of the human body are combined with each other but is not limited thereto.

The world coordinate system may be a three-dimensional (3D) coordinate system with an X-axis, a Y-axis, and a Z-axis, the origin of which is central coordinates of a camera, and the human body coordinate system may be a 3D coordinate system with a U-axis, a V-axis, and a W-axis, the origin of which is the reference point on the human body. For example, an image of the human body captured by a camera may be rendered using the world coordinate system, and either a point at which joints of the human body are combined or regions of the human body may be represented using the human body coordinate system, based on a specific point on the human body.

Herein, it may be assumed in the human body coordinate system that a point at which joints of a human body are combined or the location of a region of the human body relative to the reference point on the human body does not change.

The translation matrix calculation unit 200 may calculate a translation matrix, based on the reference point in the world coordinate system.

The reference point on the human body may be an origin of the human body coordinate system but may have the following position vector in the world coordinate system:

$$\vec{d} = (a,b,c)_{(x,y,z)} = (0,0,0)_{(u,v,w)} \qquad \text{Equation 1}$$

For example, the translation matrix may be calculated using the position vector of the reference point on the human body in the world coordinate system. In this case, the translation matrix T may be a matrix of a four-dimensional (4D) homogeneous coordinate system as follows:

$$T = \begin{bmatrix} 1 & 0 & 0 & a \\ 0 & 1 & 0 & b \\ 0 & 0 & 1 & c \\ 0 & 0 & 0 & 1 \end{bmatrix} \qquad \text{Equation 2}$$

The first vector determination unit 300 may determine a first vector based on the reference point and a second region of the human body.

The first vector of the human body may be determined based on the reference point and the second region of the human body. For example, when the reference point is a neck, the second region may include a pelvis that is known from past measurement to be spaced a predetermined distance from the neck in the human body coordinate system. In this case, the first vector may be a direction vector having a shortest distance from the second region with respect to the reference point.

The second region may be a region of the human body spaced a predetermined distance from the reference point on the human body but is not limited thereto.

The first rotation matrix calculation unit 400 may calculate a first rotation matrix $R_1(\alpha)$ rotated by an angle $\alpha$ about a first rotation vector, which is perpendicular to the determined first vector and the Z-axis of the world coordinate system, as a first rotation axis.

The first rotation vector may include an outer-product vector of the first vector and a unit vector of the negative Z-axis of the world coordinate system. Also, the first rotation vector may include an outer-product vector of a vector that has the same size as the first vector and is in the opposite direction to that of the first vector and a unit vector of the positive Z-axis of the world coordinate system.

The angle $\alpha$ may be an angle between the negative Z-axis of the world coordinate system and the first vector. Also, the first rotation vector may be an angle between a vector that has the same size as the first vector and is in the opposite direction to that of the first vector and the positive Z-axis of the world coordinate system. For example, the angle $\alpha$ may be calculated using an inner-product vector of a unit vector of the negative Z-axis of the world coordinate system and the first vector.

For example, the first rotation matrix $R_1(\alpha)$ includes a matrix rotated counterclockwise by the angle $\alpha$ about the first rotation vector as the first rotation axis. In this case, the first rotation matrix $R_1(\alpha)$ may be a matrix of the 4D homogeneous coordinate system.

For example, if the first rotation vector is (x,y,z), the first rotation matrix $R_1(\alpha)$ rotated by the angle $\alpha$ about an arbitrary axis may be expressed as the following matrix of a homogeneous coordinate system when c=cos $\alpha$, s=sin $\alpha$.

$$R_1(\alpha) = \begin{pmatrix} x^2(1-c)+c & xy(1-c)-zs & xz(1-c)+ys & 0 \\ xy(1-c)+zs & y^2(1-c)+c & yz(1-c)-xs & 0 \\ xz(1-c)-ys & yz(1-c)+xs & z^2(1-c)+c & 0 \\ 0 & 0 & 0 & 1 \end{pmatrix} \qquad \text{Equation 3}$$

$$c = \cos\alpha, s = \sin\alpha$$

The second vector determination unit 500 may determine a second vector based on the first vector and a third region of the human body.

The second vector of the human body may be determined based on the first vector and the third region of the human body. The third region may be obtained by splitting a depth image of the human body based on a degree to which the third region is close to the first vector but is not limited thereto.

For example, if a direction vector having a shortest distance from the pelvis which is the second region with respect to the neck of the human body which is the reference point of the first vector, the third region of the human body may include a shoulder adjacent to the first vector in the human body coordinate system.

In this case, the second vector may include a normal vector of the first vector. The second vector may be a normal vector that is in a direction from the first vector to the shoulder.

The second rotation matrix calculation unit 600 may calculate a second rotation matrix $R_2(\beta)$ rotated by an angle $\beta$ about the Z-axis of the world coordinate system as a second rotation axis.

The angle $\beta$ may be an angle between the Y-axis of the world coordinate system and the second vector. For example, the angle $\alpha$ may be calculated using an inner product of a unit vector of the Y-axis of the world coordinate system and the second vector.

For example, the second rotation matrix $R_2(\beta)$ includes a matrix rotated counterclockwise by the angle $\beta$ about the Z-axis of the world coordinate system as the second rotation axis. In this case, the second rotation matrix $R_2(\beta)$ may be a matrix of the 4D homogeneous coordinate system.

For example, the second rotation matrix $R_2(\beta)$ rotated by the angle $\beta$ about the Z-axis of the world coordinate system may be expressed as the following matrix of the homogeneous coordinate system.

$$R_2(\beta) = \begin{bmatrix} \cos\beta & -\sin\beta & 0 & 0 \\ \sin\beta & \cos\beta & 0 & 0 \\ 0 & 0 & 1 & 0 \\ 0 & 0 & 0 & 1 \end{bmatrix} \qquad \text{Equation 4}$$

The transformation matrix calculation unit 700 may calculate a transformation matrix, based on the translation matrix, the first rotation matrix, and the second rotation matrix.

The transformation matrix may include an affine matrix. The translation matrix and a rotation matrix may be expressed in one matrix by applying to a homogeneous coordinate system to the affine matrix.

The transformation matrix may be $R_2(\beta)R_1(\alpha)T$ as follows:

$$R_2(\beta)R_1(\alpha)T = \begin{bmatrix} \cos\beta & -\sin\beta & 0 & 0 \\ \sin\beta & \cos\beta & 0 & 0 \\ 0 & 0 & 1 & 0 \\ 0 & 0 & 0 & 1 \end{bmatrix} \qquad \text{Equation 5}$$

$$\begin{pmatrix} x^2(1-c)+c & xy(1-c)-zs & xz(1-c)+ys & 0 \\ xy(1-c)+zs & y^2(1-c)+c & yz(1-c)-xs & 0 \\ xz(1-c)-ys & yz(1-c)+xs & z^2(1-c)+c & 0 \\ 0 & 0 & 0 & 1 \end{pmatrix}$$

$$\begin{bmatrix} 1 & 0 & 0 & a \\ 0 & 1 & 0 & b \\ 0 & 0 & 1 & c \\ 0 & 0 & 0 & 1 \end{bmatrix}$$

The transformation matrix enables the features of the human body in the human coordinate system to be maintained in the world coordinate system.

The apparatus 1000 may further include a human body coordinate setting unit (not shown) for setting the human body coordinate system.

The reference point may be set as central coordinates on the human body coordinate system. Each of the axes in the human body coordinate system may be set using the first vector and the second vector.

For example, the human body coordinate system may be set by setting central coordinates $(0,0,0)_{(u,v,w)}$ as the reference point, the negative X-axis as the first vector, and the V-axis as the second vector.

The apparatus 1000 may further include a coordinate transformation unit (not shown) for transforming a point on the human body coordinate system at which joints of the human body are combined into a position on the world coordinate system, based on the transformation matrix.

Operations of the apparatus 1000 will now be sequentially described.

FIG. 2 is a flowchart of a method of estimating an orientation of a body according to an embodiment of the present disclosure.

Referring to FIG. 2, in operation S100, the apparatus 1000 determines a reference point based on a first region of a human body.

The reference point on the human body may be determined based on the first region of the human body. For example, the first region may include a head and/or neck, the information of which is easily obtained in the world coordinate system. In this case, the reference point obtained based on the head and/or neck may be set as central coordinates on the human body coordinate system.

Also, the reference point may be a point at which joints of the human body are combined but is not limited thereto, as will be described in detail with reference to FIG. 3A below.

In operation S110, the apparatus 1000 calculates a translation matrix using the reference point determined in the world coordinate system.

The reference point on the human body may be an origin of the human body coordinate system but may have a predetermined position vector in the world coordinate system, as will be described in detail with reference to FIG. 4 below.

In operation S120, the apparatus 1000 determines a first vector based on the reference point and a second region of the human body.

The first vector may include a direction vector having a shortest distance from the second region with respect to the reference point. Also, the first vector may be a direction vector having a shortest distance with respect to the reference point but is not limited thereto.

The first vector of the human body may be determined based on the reference point and the second region of the human body. For example, when the reference point is a neck, the second region may include a pelvis that is known based on prior measurements to be spaced a predetermined distance from the neck in the human body coordinate system. In the case, the first vector may be a direction vector having a shortest distance from the second region with respect to the reference point.

The second region may be a region of the human body spaced a predetermined distance from the reference point on the human body but is not limited thereto, as will be described in detail with reference to FIGS. 3A and 5 below.

In operation S130, the apparatus 1000 calculates a first rotation matrix rotated by an angle α about a first rotation vector, which is perpendicular to the first vector and the Z-axis of the world coordinate system, as a first rotation axis. The first rotation vector may be perpendicular to each of the axes of the world coordinate system but is not limited thereto.

The first rotation vector may include an outer-product vector of the first vector and a unit vector of the negative Z-axis of the world coordinate system. Also, the first rotation vector may include an outer-product vector of a vector that has the same size as the first vector and is in the opposite direction to that of the first vector and a unit vector of the positive Z-axis of the world coordinate system.

The angle α may be an angle between the negative Z-axis of the world coordinate system and the first vector. The first rotation vector may be an angle between a vector that has the same size as the first vector and is in the opposite direction to that of the first vector and the positive Z-axis of the world coordinate system. For example, the angle α may be calculated using an inner-product of a unit vector of the negative Z-axis of the world coordinate system and the first vector. The angle α may be an angle between each of the axes of world coordinate system and the first vector but is not limited thereto.

For example, the first rotation matrix includes a matrix rotated counterclockwise by the angle α about the first rotation vector as a first rotation axis. In this case, the first rotation matrix $R_1(\alpha)$ may be a matrix of the 4D homogeneous coordinate system. Also, the first rotation matrix $R_1(\alpha)$ may be an N-dimensional (ND) homogeneous coordinate system but is not limited thereto, as will be described in detail with reference to FIG. 6 below.

In operation S140, the apparatus 1000 determines a second vector based on the first vector and a third region of the human body.

The second vector of the human body may be determined based on the first vector and the third region of the human body. The third region may be obtained by splitting a depth image of the human body based on a degree to which the third region is close to the first vector, but is not limited thereto.

The second vector may include a normal vector of the first vector but is not limited thereto, as will be described in detail with reference to FIGS. 3B to 5 below.

In operation S150, the apparatus 1000 calculates a second rotation matrix $R_2(\beta)$ rotated by an angle β about the Z-axis of the world coordinate system as a second rotation axis.

According to an embodiment of the present invention, the angle β may be an angle between the Y-axis of the world coordinate system and the second vector. For example, the angle α may be calculated using an inner product of a unit vector of the Y-axis of the world coordinate system and the second vector. Also, the angle β may be an angle between each of the axes of the world coordinate system and the second vector but is not limited thereto.

For example, the second rotation matrix $R_2(\beta)$ may be a matrix rotated counterclockwise by the angle β about the Z-axis of the world coordinate system as a second rotation axis. In this case, the second rotation matrix $R_2\beta$ may be a matrix of the 4D homogeneous coordinate system. The second rotation matrix $R_2(\beta)$ may be a matrix of an ND homogeneous coordinate system but is not limited thereto, as will be described in detail with reference to FIG. 7 below.

In operation S160, the apparatus 1000 calculates a transformation matrix, based on the translation matrix, the first rotation matrix, and the second rotation matrix.

The transformation matrix may include an affine matrix but is not limited thereto. The translation matrix and the rotation matrix may be combined in one matrix by applying the homogeneous coordinate system to the affine matrix.

According to an embodiment of the present disclosure, the transformation matrix may be $R_2(\beta)R_1(\alpha)T$, as will be described in detail with reference to FIG. 8 below.

Figure 3A:
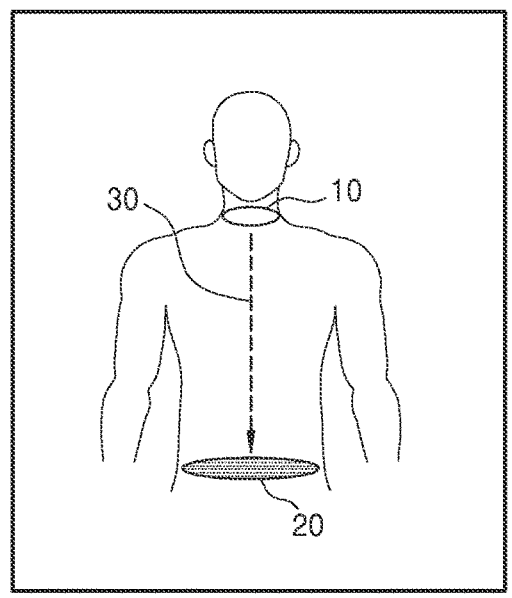
FIGS. 3A and 3B illustrate a reference point, a first vector, and a second vector determined by an apparatus for estimating an orientation of a body based on regions of a human body according to an embodiment of the present disclosure.
Figure 3B:
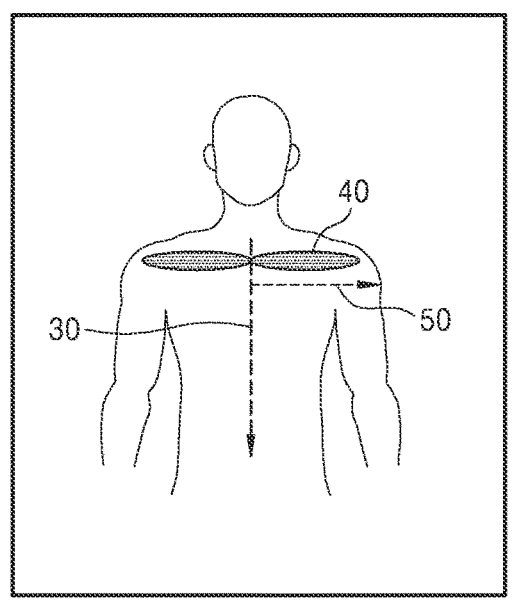

FIGS. 3A and 3B illustrate a reference point, a first vector, and a second vector determined by an apparatus based on regions of a human body according to an embodiment of the present disclosure.

Referring to FIGS. 3A and 3B, the world coordinate system may be a 3D coordinate system with the X, Y, and Z axes, the origin of which is central coordinates of a camera and the human body coordinate system may be a 3D coordinate system with the U, V, and W axes, the origin of which is the reference point on the human body, but various embodiments of the present disclosure are not limited thereto. For example, an image of the human body captured by a camera may be rendered using the world coordinate system, and either a point at which joints of the human body are combined or regions of the human body may be represented using the human body coordinate system, based on a specific point on the human body.

Herein, it may be assumed in the human body coordinate system that a point at which junctions of the human body are combined or the location of a region of the human body does not change with respect to the reference point on the human body.

Referring to FIG. 3A, a first vector 30 of a human body 2000 may be determined based on a reference point 10 and a second region 20 of the human body 2000. For example, when the reference point 10 is a neck, the second region 20 may include a pelvis that has been trained to be spaced a predetermined distance from the neck in the human body coordinate system. In this case, the first vector 30 may be a direction vector having a shortest distance from the second region 20 with respect to the reference point 10. The first vector 30 may be a direction vector having a shortest distance with respect to the reference point but is not limited thereto.

Referring to FIG. 3B, a second vector 50 of the human body 2000 may be determined based on the first vector 30 and a third region 40 of the human body 2000. The third region 40 may be obtained by splitting a depth image of the human body 2000 based on a degree to which the third region 40 is close to the first vector 30 but is not limited thereto.

For example, when a direction vector having a shortest distance from a pelvis which is the second region with respect to the neck which is the reference point is the first vector, the third region 40 of the human body 2000 may include a shoulder adjacent to the first vector 30 in the human body 2000 coordinate system.

In this case, the second vector 50 may include a normal vector of the first vector 30 but is not limited thereto. For example, the second vector 50 may be a normal vector that is in a direction from the first vector 30 to the shoulder.

Figure 4:
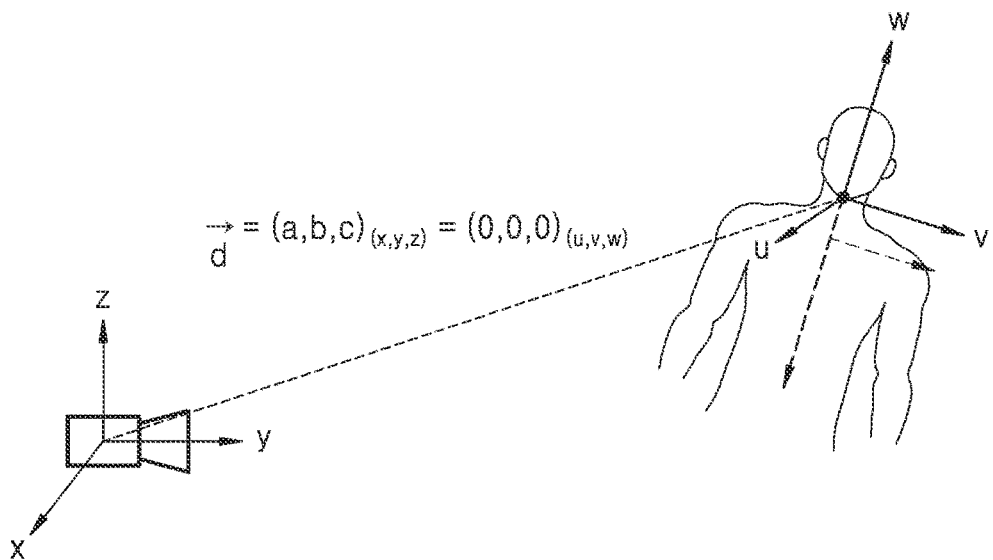
FIG. 4 is a diagram illustrating a case in which an apparatus for estimating an orientation of a body uses a reference point on a human body in a world coordinate system to calculate a translation matrix according to an embodiment of the present disclosure.

FIG. 4 is a diagram illustrating a case in which an apparatus uses a reference point on a human body in a world coordinate system to calculate a translation matrix T according to an embodiment of the present disclosure.

The world coordinate system may be a 3D coordinate system with the X, Y, and Z axes, the origin of which is central coordinates of a camera and the human body coordinate system may be a 3D coordinate system with the U, V, and W axes, the origin of which is the reference point on the human body, but various embodiments of the present disclosure are not limited thereto. For example, an image of the human body captured using a camera may be rendered using the world coordinate system, and a point at which joints of the human body are combined or regions of the human body may be expressed using the human body coordinate system, based on a specific position on the human body.

Referring to FIG. 4, the reference point may be central coordinates on the human body coordinate system, and each of the axes of the human body coordinate system may be set using the first and second vectors.

For example, the human body coordinate system may be set by setting central coordinates $(0,0,0)_{(u,v,w)}$ as the reference point, the negative X-axis as the first vector, and the V-axis the second vector but is not limited thereto.

The reference point on the human body may be an origin of the human body coordinate system but may have the following position vector in the world coordinate system.

$$\vec{d}=(a,b,c)_{(x,y,z)}=(0,0,0)_{(u,v,w)} \qquad \text{Equation 6}$$

For example, the translation matrix T may be calculated using a position vector of the reference point on the human body in the world coordinate system. In this case, the translation matrix T may be the following matrix of the 4D homogeneous coordinate system but is not limited thereto.

$$T = \begin{bmatrix} 1 & 0 & 0 & a \\ 0 & 1 & 0 & b \\ 0 & 0 & 0 & c \\ 0 & 0 & 0 & 1 \end{bmatrix} \qquad \text{Equation 7}$$

Figure 5:
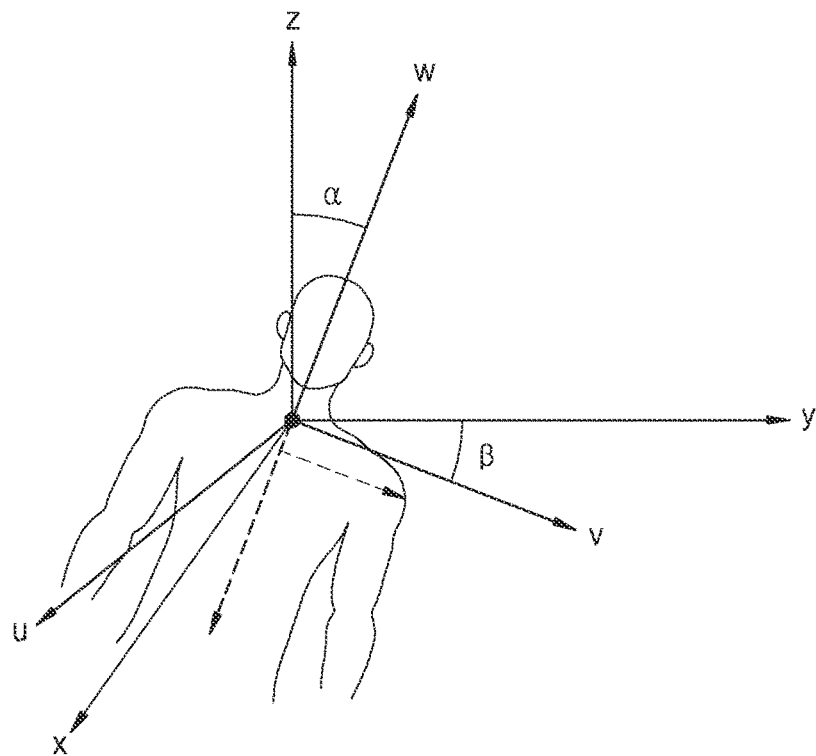
FIG. 5 is a diagram illustrating a relationship between a first vector and a second vector determined by an apparatus for estimating an orientation of a body based on a world coordinate system and regions of a human body according to an embodiment of the present disclosure.

FIG. 5 is a diagram illustrating a relationship between a first vector and a second vector determined by an apparatus based on a world coordinate system and regions of a human body according to an embodiment of the present disclosure.

Referring to FIG. 5, axes of the world coordinate system may not be the same as those of the human body coordinate system.

For example, the human body coordinate system may be set by setting central coordinates $(0,0,0)_{(u,v,w)}$ on the human body coordinate system as a reference point, the negative W-axis of the human body coordinate system as the first vector, and the V-axis of the human body coordinate system as the second vector, but is not limited thereto. In this case, the Z-axis of the world coordinate system and the W-axis of the human body coordinate system may be spaced by the angle $\alpha$ from each other, and the Y-axis of the world coordinate system and the V-axis of the human body coordinate system may be spaced by the angle $\beta$.

More specifically, the angle $\alpha$ may be an angle between the negative Z-axis of the world coordinate system and the first vector. The first rotation vector may be an angle between a vector that has the same size as the first vector and is in the opposite direction to that of the first vector and the positive Z-axis of the world coordinate system. For example, the angle $\alpha$ may be calculated using an inner product of a unit vector of the negative Z-axis of the world coordinate system and the first vector. Also, the angle α may be an angle between each of the axes of the world coordinate system and the first vector but is not limited thereto. For example, the angle α may be calculated using an inner product of a unit vector of the Y-axis of the world coordinate system and the second vector.

Also, the angle β may be an angle between the Y-axis of the world coordinate system and the second vector. Also, the angle β may be an angle between each of the axes of the world coordinate system and the second vector, but is not limited thereto.

Figure 6:
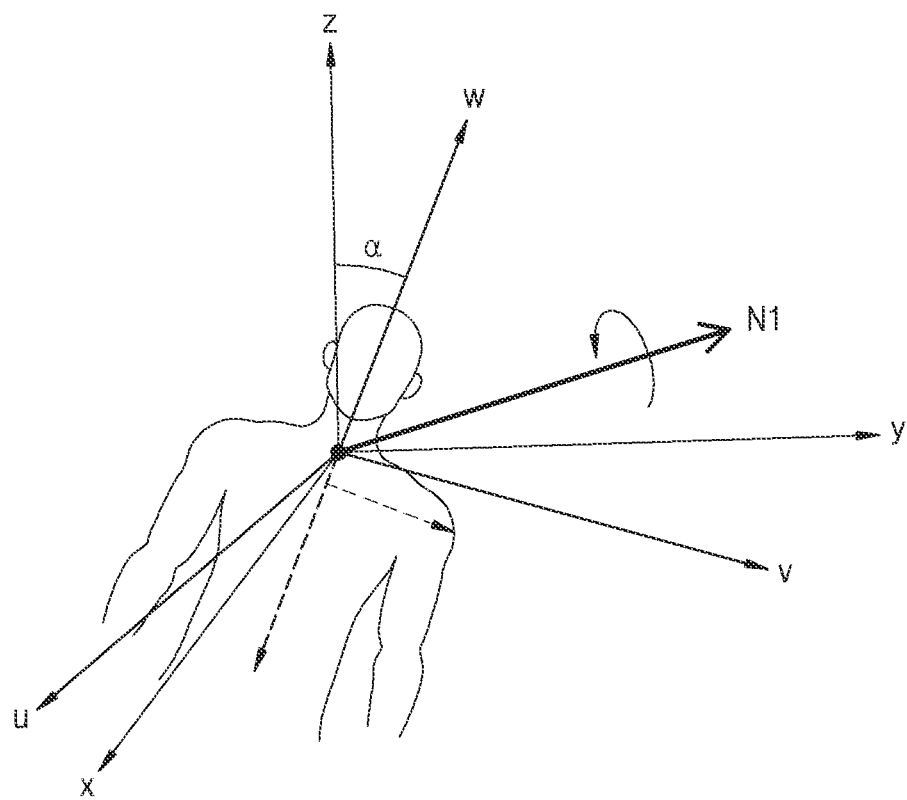
FIG. 6 is a diagram illustrating a case in which an apparatus for estimating an orientation of a body uses a first vector of a human body in a world coordinate system to calculate a first rotation matrix according to an embodiment of the present disclosure.

FIG. 6 is a diagram illustrating a case in which an apparatus uses a first vector of a human body in a world coordinate system to calculate a first rotation matrix $R_1(\alpha)$ according to an embodiment of the present disclosure.

For example, a first rotation vector N1 (=x,y,z) may include an outer-product vector of a vector that has the same size as the first vector and is in the opposite direction as that of the first vector and a unit vector of the positive Z-axis of the world coordinate system.

Referring to FIG. 6, when the first rotation matrix $R_1(\alpha)$ rotated by an angle α about the first rotation vector N1 (=x,y,z) as an arbitrary axis is c=cos α, s=sin α, the first rotation matrix $R_1(\alpha)$ may be expressed as the following matrix of the homogeneous coordinate system but is not limited thereto.

$$R_1(\alpha) = \begin{pmatrix} x^2(1-c)+c & xy(1-c)-zs & xz(1-c)+ys & 0 \\ xy(1-c)+zs & y^2(1-c)+c & yz(1-c)-xs & 0 \\ xz(1-c)-ys & yz(1-c)+xs & z^2(1-c)+c & 0 \\ 0 & 0 & 0 & 1 \end{pmatrix} \quad \text{Equation 8}$$

$$c = \cos\alpha, s = \sin\alpha$$

Figure 7:
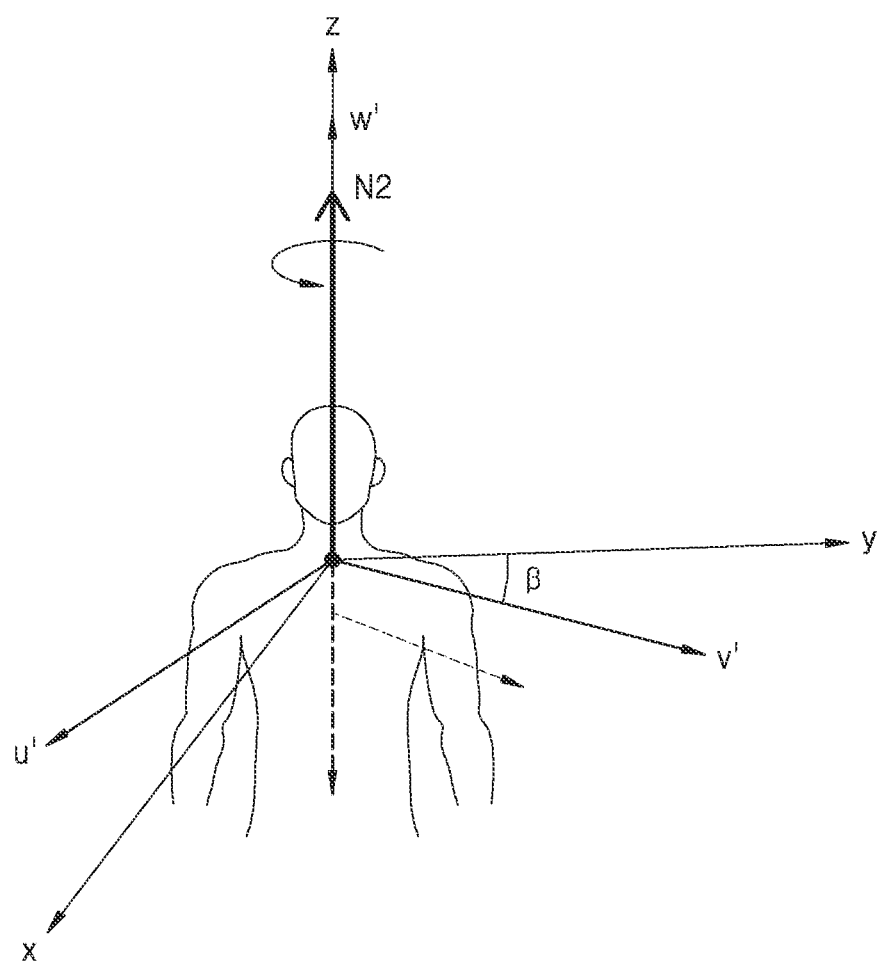
FIG. 7 is a diagram illustrating a case in which an apparatus for estimating an orientation of a body uses a second vector of a human body in a world coordinate system to calculate a second rotation matrix according to an embodiment of the present disclosure.

FIG. 7 is a diagram illustrating a case in which an apparatus uses a second vector of a human body in a world coordinate system to calculate a second rotation matrix $R_2(\beta)$ according to an embodiment of the present disclosure.

Referring to FIG. 7, a second rotation matrix $R_2(\beta)$ includes a matrix rotated counterclockwise by an angle β about the Z-axis of the world coordinate system as a second rotation axis. In this case, the second rotation matrix $R_2(\beta)$ may be a matrix of a 4D homogeneous coordinate system but is not limited thereto.

For example, the second rotation matrix $R_2(\beta)$ rotated by the angle β about the Z-axis of the world coordinate system may be expressed as the following matrix of a homogeneous coordinate system but is not limited thereto.

$$R_2(\beta) = \begin{bmatrix} \cos\beta & -\sin\beta & 0 & 0 \\ \sin\beta & \cos\beta & 0 & 0 \\ 0 & 0 & 1 & 0 \\ 0 & 0 & 0 & 1 \end{bmatrix} \quad \text{Equation 9}$$

Figure 8:
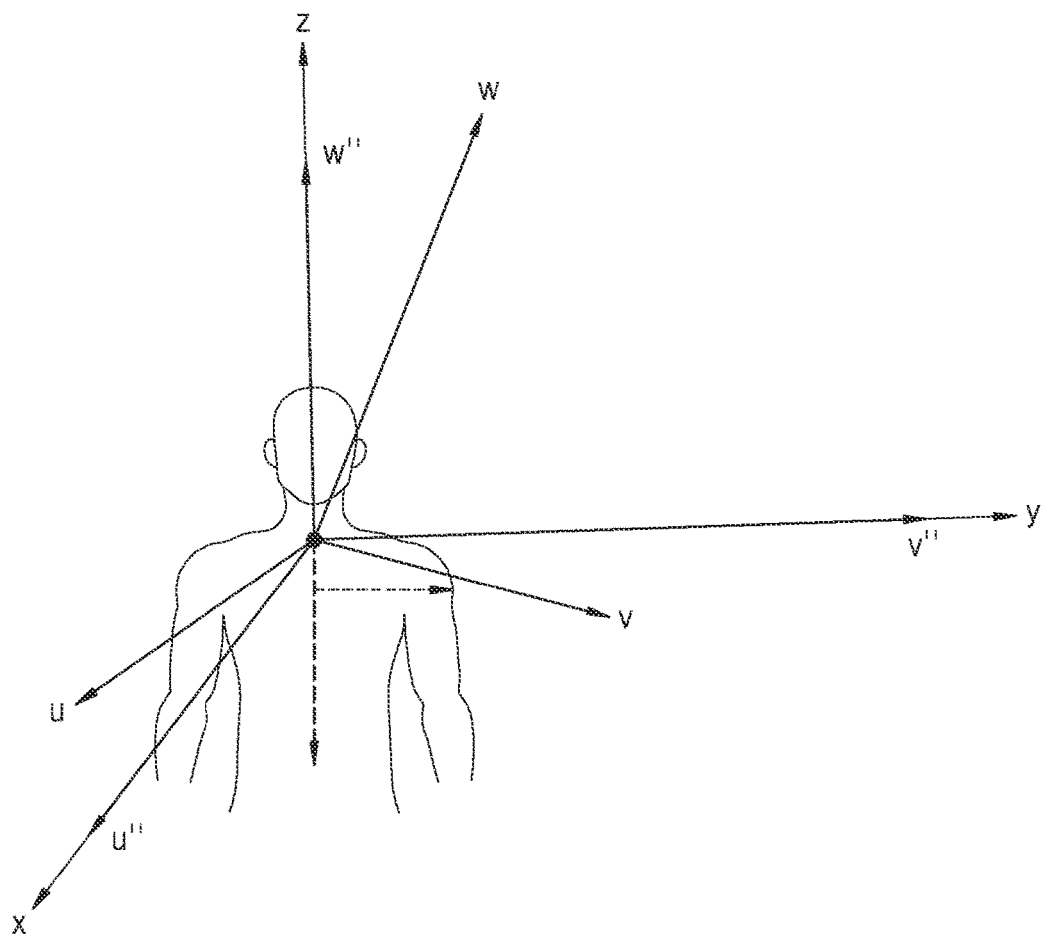
FIG. 8 is a diagram illustrating a case in which an apparatus for estimating an orientation of a body uses a transformation matrix to transform a human body coordinate system into a world coordinate system according to an embodiment of the present disclosure.

FIG. 8 is a diagram illustrating a case in which the apparatus 1000 uses a transformation matrix to transform a human body coordinate system into a world coordinate system according to an embodiment of the present disclosure.

Referring to FIG. 8, the transformation matrix may include an affine matrix but is not limited thereto. The translation matrix and a rotation matrix may be expressed in one matrix by applying to a homogeneous coordinate system to the affine matrix.

According to an embodiment of the present disclosure, the transformation matrix may be $R_2(\beta)R_1(\alpha)T$. The human body coordinate system may be transformed into the world coordinate system using the transformation matrix, and thus a point on the human body coordinate system at which joints of a human body are combined may be transformed into a point on the world coordinate system, based on the transformation matrix. The transformation matrix enables the features of the human body in the human coordinate system to be maintained in the world coordinate system.

For example, an arbitrary position (u1, v1, w1) on the human body coordinate system may be transformed into an arbitrary position (x3, y3, z3) on the world coordinate system based on the transformation matrix but is not limited thereto.

$$\begin{bmatrix} x_1 \\ y_1 \\ z_1 \\ 1 \end{bmatrix} = \begin{bmatrix} 1 & 0 & 0 & a \\ 0 & 1 & 0 & b \\ 0 & 0 & 1 & c \\ 0 & 0 & 0 & 1 \end{bmatrix} \begin{bmatrix} u_1 \\ v_1 \\ w_1 \\ 1 \end{bmatrix} = T \begin{bmatrix} u_1 \\ v_1 \\ w_1 \\ 1 \end{bmatrix} \quad \text{Equation 10}$$

$$\begin{bmatrix} x_2 \\ y_2 \\ z_2 \\ 1 \end{bmatrix} = R_1 T \begin{bmatrix} u_1 \\ v_1 \\ w_1 \\ 1 \end{bmatrix} \quad \text{Equation 11}$$

$$\begin{bmatrix} x_3 \\ y_3 \\ z_3 \\ 1 \end{bmatrix} = \begin{bmatrix} \cos\beta & -\sin\beta & 0 & 0 \\ \sin\beta & \cos\beta & 0 & 0 \\ 0 & 0 & 1 & 0 \\ 0 & 0 & 0 & 1 \end{bmatrix} R_1 T \begin{bmatrix} u_1 \\ v_1 \\ w_1 \\ 1 \end{bmatrix} = R_2 R_1 T \begin{bmatrix} u_1 \\ v_1 \\ w_1 \\ 1 \end{bmatrix} \quad \text{Equation 12}$$

$$R_2(\beta)R_1(\alpha)T = \begin{bmatrix} \cos\beta & -\sin\beta & 0 & 0 \\ \sin\beta & \cos\beta & 0 & 0 \\ 0 & 0 & 1 & 0 \\ 0 & 0 & 0 & 1 \end{bmatrix} \quad \text{Equation 13}$$

$$\begin{pmatrix} x^2(1-c)+c & xy(1-c)-zs & xz(1-c)+ys & 0 \\ xy(1-c)+zs & y^2(1-c)+c & yz(1-c)-xs & 0 \\ xz(1-c)-ys & yz(1-c)+xs & z^2(1-c)+c & 0 \\ 0 & 0 & 0 & 1 \end{pmatrix}$$

$$\begin{bmatrix} 1 & 0 & 0 & a \\ 0 & 1 & 0 & b \\ 0 & 0 & 1 & c \\ 0 & 0 & 0 & 1 \end{bmatrix}$$

Apparatuses according to various embodiments of the present disclosure may include a processor, a memory for storing and executing program data, a permanent storage such as a disk drive, a user interface device such as a touch panel, a key, or a button, etc.

Methods embodied as software modules or algorithms may be stored in a computer readable recording medium in the form of computer readable codes or program instructions that may be executed by the processor. Examples of the computer readable recording medium include a magnetic recording medium (e.g., a read-only memory (ROM), a random-access memory (RAM), a floppy disk, a hard disc, etc.), an optical recording medium (e.g., compact-disk ROM (CD-ROM), a digital versatile disc (DVD)), etc. The computer readable recording medium may be distributed among computer systems that are interconnected through a network, and the present disclosure may be stored and implemented as computer readable code in the distributed system. The computer readable recording medium may be read by a computer and executed by a processor.

All references, including publications, patent applications, and patents, cited herein, are hereby incorporated by reference to the same extent as if each reference were individually and specifically indicated to be incorporated by reference and were set forth in its entirety herein.

To help understand the present disclosure, reference numerals are used in various embodiments illustrated in the drawings and specific terms are used to explain these various embodiments. However, the present disclosure is not limited by the specific terms. The present disclosure may cover all components that are obvious to those of ordinary skill in the art.

The present disclosure may be described in terms of functional block components and various processing steps. Such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, where the elements of the present disclosure are implemented using software programming or software elements, the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present disclosure could employ any number of techniques according to the related art for electronics configuration, signal processing and/or control, data processing and the like. The words "mechanism" and "element" are used broadly and are not limited to mechanical or physical embodiments of the present disclosure, but may include software routines in conjunction with processors, etc.

The particular implementations shown and described herein are illustrative examples of the present disclosure and are not intended to otherwise limit the scope of the disclosure in any way. For the sake of brevity, electronics, control systems, software development and other functional aspects of the systems (and components of the individual operating components of the systems) according to the related art may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical".

The use of the terms "a", "an", and "the" and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein may be performed in any suitable order unless otherwise indicated herein or otherwise clearly contradicted by context. The use of any and all examples, or language of the present disclosure (e.g., "such as") provided herein, is intended merely to better illuminate the disclosure and does not pose a limitation on the scope of the disclosure unless otherwise claimed. Numerous modifications and adaptations will be readily apparent to those skilled in this art without departing from the spirit and scope of the present disclosure.

It should be understood that the various embodiments of the present disclosure described therein should be considered in a descriptive sense only and not for purposes of limitation. Descriptions of features or aspects within each embodiment of the present disclosure should typically be considered as available for other similar features or aspects in other embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of transmitting information for an orientation of a body, the method comprising:
   receiving position information indicating a position of a first region of a human body;
   determining a reference point based on the received position information;
   determining a translation matrix of a world coordinate system, based on the determined reference point;
   determining a first vector based on the determined reference point and a second region of the human body;
   determining a first rotation matrix rotated by an angle $\alpha$ about a first rotation vector, which is perpendicular to the determined first vector and a Z-axis of the world coordinate system, as a first rotation axis;
   determining a second vector, based on the determined first vector and a third region of the human body;
   determining a second rotation matrix rotated by an angle $\beta$ about the Z-axis of the world coordinate system as a second rotation axis;
   determining a transformation matrix, which is used to mutually transform coordinates between a human body coordinate system and the world coordinate system, based on the determined translation matrix, the determined first rotation matrix, and the determined second rotation matrix; and
   transmitting information indicating the determined transformation matrix to an external device,
   wherein the angle $\alpha$ is an angle between the Z-axis and the determined first vector, and
   wherein the angle $\beta$ is an angle between a Y-axis of the world coordinate system and the determined second vector.

2. The method of claim 1, wherein the reference point comprises a point at which joints of the human body are combined.

3. The method of claim 1, wherein the first vector comprises a direction vector having a shortest distance from the second region with respect to the determined reference point.

4. The method of claim 1, wherein the second vector comprises a normal vector of the determined first vector.

5. The method of claim 1, wherein the first rotation vector comprises an outer-product vector of the determined first vector and a unit vector of the Z-axis of the world coordinate system.

6. The method of claim 1, wherein the transformation matrix comprises an affine matrix.

7. The method of claim 1, further comprising:
setting a human body coordinate system,
wherein central coordinates on the human body coordinate system represent the determined reference point, and
wherein axes of the human body coordinate system are set using the determined first vector and the determined second vector.

8. The method of claim 1, further comprising:
transforming a point on the human body coordinate system at which joints of the human body are combined into a point on the world coordinate system, based on the determined transformation matrix.

9. An apparatus for transmitting information for an orientation of a body, the apparatus comprising:
a receiver configured to receive position information indicating a position of a first region of a human body;
a processor configured to:
determine a reference point based on the received position information,
determine a translation matrix of a world coordinate system, based on the determined reference point,
determine a first vector, based on the determined reference point and a second region of the human body,
determine a first rotation matrix rotated by an angle α about a first rotation vector, which is perpendicular to the determined first vector and a Z-axis of the world coordinate system, as a first rotation axis,
determine a second vector, based on the determined first vector and a third region of the human body,
determine a second rotation matrix rotated by an angle β about the Z-axis of the world coordinate system as a second rotation axis and
determine a transformation matrix, which is used to mutually transform coordinates between a human body coordinate system and the world coordinate system, based on the determined translation matrix, the determined first rotation matrix, and the determined second rotation matrix; and
a transmitter configured to transmit information indicating the determined transformation matrix to an external device,
wherein the angle α is an angle between the Z-axis and the determined first vector, and
wherein the angle β is an angle between a Y-axis of the world coordinate system and the determined second vector.

10. The apparatus of claim 9, wherein the reference point comprises a point at which joints of the human body are combined.

11. The apparatus of claim 9, wherein the first vector comprises a direction vector having a shortest distance from the second region with respect to the determined reference point.

12. The apparatus of claim 9, wherein the second vector comprises a normal vector of the determined first vector.

13. The apparatus of claim 9, wherein the first rotation vector comprises an outer-product vector of the determined first vector and a unit vector of the Z-axis of the world coordinate system.

14. The apparatus of claim 9, wherein the transformation matrix comprises an affine matrix.

15. The apparatus of claim 9, wherein the processor is further configured to:
set a human body coordinate system setting unit,
set central coordinates on the human body coordinate system as the determined reference point, and
set axes of the human body coordinate system based on the first vector and the determined second vector.

16. The apparatus of claim 9, wherein the processor is further configured to transform a point on the human body coordinate system at which joints of the human body are combined into a point on the world coordinate system, based on the determined transformation matrix.

17. A non-transitory computer readable recording medium having recorded thereon computer program codes causing a method of transmitting information for an orientation of a body to perform when the computer program codes are read and executed by a processor, the method comprising:
receiving position information indicating a position of a first region of a human body;
determining a reference point based on the received position information;
determining a translation matrix of a world coordinate system, based on the determined reference point;
determining a first vector, based on the determined reference point and a second region of the human body;
determining a first rotation matrix rotated by an angle α about a first rotation vector, which is perpendicular to the determined first vector and a Z-axis of the world coordinate system, as a first rotation axis;
determining a second vector, based on the determined first vector and a third region of the human body;
determining a second rotation matrix rotated by an angle β about the Z-axis of the world coordinate system as a second rotation axis;
determining a transformation matrix, which is used to mutually transform coordinates between a human body coordinate system and the world coordinate system, based on the determined translation matrix, the determined first rotation matrix, and the determined second rotation matrix; and
transmitting information indicating the determined transformation matrix to an external device,
wherein the angle α is an angle between the Z-axis and the determined first vector, and
wherein the angle β is an angle between a Y-axis of the world coordinate system and the determined second vector.

\* \* \* \* \*